(12) United States Patent  
Yudanov

(10) Patent No.: US 10,578,083 B2
(45) Date of Patent: Mar. 3, 2020

(54) FUEL PUMP ASSEMBLY

(71) Applicant: VOLVO TRUCK CORPORATION, Göteborg (SE)

(72) Inventor: Sergi Yudanov, Västra Frölunda (SE)

(73) Assignee: VOLVO TRUCK CORPORATION, Göteborg (SE)

(*) Notice: Subject to any disclaimer, the term of this patent is extended or adjusted under 35 U.S.C. 154(b) by 65 days.

(21) Appl. No.: 15/567,828

(22) PCT Filed: May 4, 2016

(86) PCT No.: PCT/EP2016/060036
§ 371 (c)(1),
(2) Date: Oct. 19, 2017

(87) PCT Pub. No.: WO2016/177799
PCT Pub. Date: Nov. 10, 2016

(65) Prior Publication Data
US 2018/0156205 A1 Jun. 7, 2018

Related U.S. Application Data

(63) Continuation-in-part of application No. PCT/EP2015/060104, filed on May 7, 2015.

(51) Int. Cl.
*F02M 21/00* (2006.01)
*F04B 1/0443* (2020.01)
(Continued)

(52) U.S. Cl.
CPC ....... *F04B 1/0443* (2013.01); *F02M 21/0212* (2013.01); *F02M 21/0227* (2013.01);
(Continued)

(58) Field of Classification Search
CPC ........ F04B 1/0443; F04B 53/18; F04B 53/04; F02M 21/0227; F02M 21/0212;
(Continued)

(56) References Cited

U.S. PATENT DOCUMENTS 2,446,497 A * 8/1948 Thomas ................. F02D 1/162
123/374
4,700,672 A * 10/1987 Baguena ............. F02D 19/0684
123/299
(Continued)

FOREIGN PATENT DOCUMENTS

AT 500996 A1 5/2006
CN 101479473 A 7/2009
(Continued)

OTHER PUBLICATIONS

International Search Report (dated Oct. 13, 2016) for corresponding International App. PCT/EP2016/060036.
(Continued)

*Primary Examiner* — Phutthiwat Wongwian
*Assistant Examiner* — Sherman D Manley
(74) *Attorney, Agent, or Firm* — Venable LLP; Jeffri A. Kaminski

(57) ABSTRACT

A fuel pump assembly for pressurizing fuel such as dimethyl ether (DME). The fuel pump assembly includes a plunger assembly and a pump block defining a pumping chamber and a plunger assembly cavity in communication with the pumping chamber. The plunger assembly is movable at least partially in the plunger assembly cavity towards and from the pumping chamber. The fuel pump assembly includes a metering valve and a suction channel located between the metering valve and the pumping chamber in an intended direction of flow of the fuel, wherein the fuel pump assembly comprises a leakage return conduit, with a first leakage return conduit opening in fluid communication with said plunger assembly cavity, adapted to return fuel that has leaked from the pumping chamber. The leakage return conduit includes a second leakage return conduit opening located in the suction channel.

49 Claims, 9 Drawing Sheets

(51) Int. Cl.
| | |
|---|---|
| *F02M 59/44* | (2006.01) |
| *F02M 21/02* | (2006.01) |
| *F02M 59/02* | (2006.01) |
| *F04B 53/04* | (2006.01) |
| *F04B 53/18* | (2006.01) |
| *F02M 63/00* | (2006.01) |
| *F02M 59/46* | (2006.01) |

(52) U.S. Cl.
CPC ......... *F02M 59/02* (2013.01); *F02M 59/442* (2013.01); *F04B 53/04* (2013.01); *F04B 53/18* (2013.01); *F02M 21/0245* (2013.01); *F02M 59/46* (2013.01); *F02M 63/0001* (2013.01); *F02M 2200/953* (2013.01); *Y02T 10/32* (2013.01)

(58) Field of Classification Search
CPC .. F02M 21/0245; F02M 59/02; F02M 59/442; F02M 59/46; F02M 63/0001; F02M 2200/953; Y02T 10/32
See application file for complete search history.

(56) References Cited

U.S. PATENT DOCUMENTS

| | | | | |
|---|---|---|---|---|
| 5,460,133 | A | * | 10/1995 | Perr ..................... F02M 57/024 123/446 |
| 2002/0092505 | A1 | * | 7/2002 | Rembold ........... F02M 37/0052 123/464 |
| 2002/0189589 | A1 | * | 12/2002 | Kato ...................... F02M 21/08 123/458 |
| 2008/0003122 | A1 | | 1/2008 | Tian et al. |
| 2009/0126696 | A1 | | 5/2009 | Cooke |
| 2009/0159053 | A1 | * | 6/2009 | Stockner ................ F02M 59/44 123/495 |
| 2011/0005494 | A1 | | 1/2011 | Yudanov |
| 2013/0021357 | A1 | | 8/2013 | Yudanov |
| 2014/0109874 | A1 | * | 4/2014 | Yudanov ................ F02M 59/44 123/446 |

FOREIGN PATENT DOCUMENTS

| | | |
|---|---|---|
| DE | 102008042649 A1 | 4/2010 |
| DE | 102009000835 A1 | 8/2010 |
| DE | 102009000859 A1 | 8/2010 |
| DE | 102009026715 A1 | 12/2010 |
| DE | 102010039211 A1 | 2/2012 |
| DE | 102012202717 A1 | 8/2013 |
| DE | 102012202720 A1 | 8/2013 |
| DE | 102013212261 A1 | 12/2014 |
| EP | 1167751 A1 | 1/2002 |
| EP | EP1482164 A1 | 12/2004 |
| GB | 2288852 A | 11/1995 |
| JP | H10184494 A | 7/1998 |
| JP | 2003056409 A | 2/2003 |
| JP | 2004278491 A | 10/2004 |
| JP | 2012097712 A | 5/2012 |
| KR | 20130037791 A | 4/2013 |
| WO | 2011048456 A1 | 4/2011 |
| WO | 2013124103 A1 | 8/2013 |
| WO | 2014063715 A1 | 5/2014 |

OTHER PUBLICATIONS

European Official Action (dated Apr. 12, 2019) for corresponding European App.16 720 426.2.

* cited by examiner

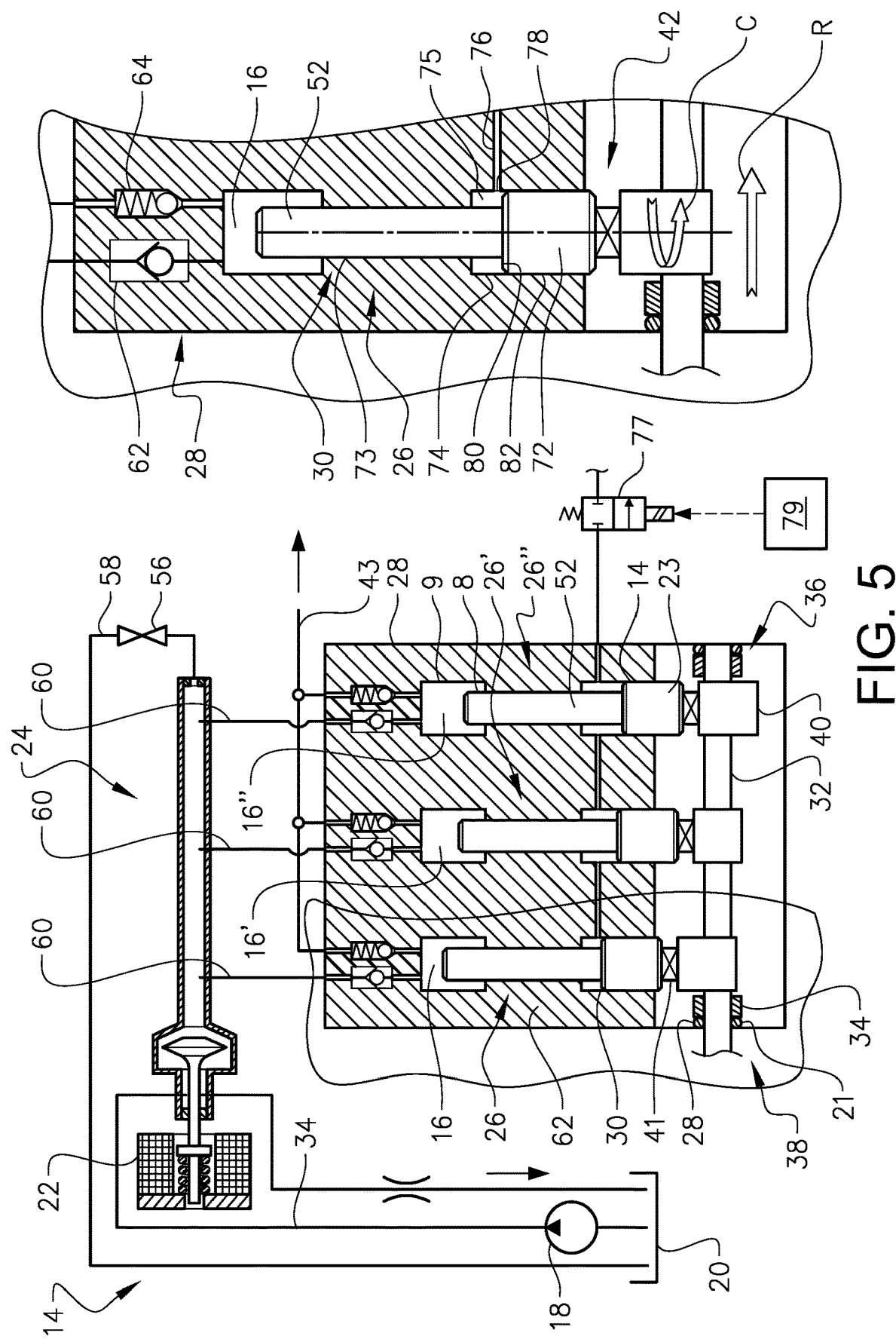

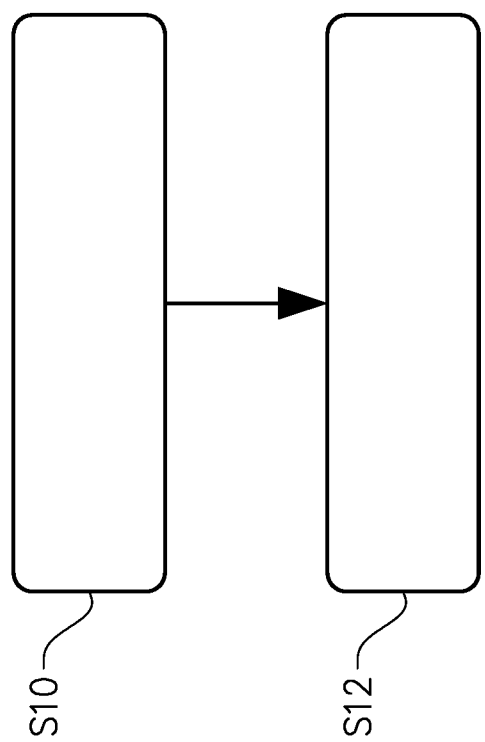

FUEL PUMP ASSEMBLY

BACKGROUND AND SUMMARY

The present disclosure relates to a fuel pump assembly. Moreover, the present disclosure relates to each one of an internal combustion engine, a vehicle and a method for pressurizing fuel using a fuel pump assembly.

Fuel pump assemblies for supplying high-pressure fuel to fuel injectors are known. Generally, such a system comprises a low pressure fuel system feeding fuel to a pumping chamber co-operating with a plunger for further pressurizing the fuel.

One potential problem with such a fuel pump assembly is that fuel leakage may occur, for instance between the plunger and the component(s) accommodating the plunger. In order to handle such a possible leakage, WO 2012/171593 A1 proposes the use of a drain line for draining at least fuel vapour from an interior of a pump block.

Although the solution as proposed in WO 2012/171593 A1 is appropriate for many applications, there may still be a need for improving fuel pump assemblies for pressurizing fuel, such as DME.

It is desirable to provide a fuel pump assembly in which fuel leakage can be handled in an appropriate manner.

As such, the present disclosure relates to a fuel pump assembly for pressurizing fuel. The fuel preferably comprises dimethyl ether (DME). The fuel pump assembly comprises a plunger assembly and a pump block defining a pumping chamber and a plunger assembly cavity in communication with the pumping chamber. The plunger assembly is movable at least partially in the plunger assembly cavity towards and away from the pumping chamber. The fuel pump assembly comprises a metering valve and a suction channel located between the metering valve and the pumping chamber in an intended direction of flow of the fuel. The fuel pump assembly comprises a leakage return conduit, with a first leakage return conduit opening in fluid communication with the plunger assembly cavity, adapted to return fuel that has leaked from the pumping chamber.

According to the present disclosure, the leakage return conduit comprises a second leakage return conduit opening located in the suction channel.

The suction channel generally has few components vulnerable to deposits generated by the fuel. Also, conditions that generally exist in the suction channel suppress formation of fuel deposits in the parts of it that may impact the performance of the fuel pump assembly. As such, a fuel pump assembly as has been presented hereinabove, in which the leakage return conduit is in fluid communication with the suction channel, implies an appropriately low risk for deposits of returned leaked fuel in the fuel supply system as compared to prior art systems wherein leaked fuel is instead recirculated to portions of a fuel supply system that have a lower pressure, e.g. back to a fuel tank.

Optionally, the leakage return conduit provides a direct fluid communication between the plunger assembly cavity and the suction channel. As a non-limiting example, the leakage return conduit may be constantly open. For instance, the leakage return conduit may be free from flow regulating means such as valves.

Optionally, the first leakage return conduit opening is located in the plunger assembly cavity.

Optionally, the plunger assembly cavity comprises a leakage chamber at least partially surrounding the plunger assembly. The first leakage return conduit opening is located in the leakage chamber.

Optionally, the fuel pump assembly comprises a first sealing means for preventing fuel from escaping from the pumping chamber along the plunger assembly.

The first sealing means implies an appropriately low rate of leakage past the plunger.

Optionally, the first sealing means is obtained by means of a clearance between the plunger assembly and a portion of the pump block, preferably a metal portion of the pump block. The clearance is preferably within the range of 0.1 to 10 micrometres, more preferred within the range of 0.5 to 5 micrometres.

The above clearance implies a preferred implementation for achieving the first sealing means.

Optionally, the first leakage return conduit opening is located downstream of the first sealing means.

Optionally, the fuel pump assembly comprises a second sealing means for preventing fuel that has passed the first sealing means from passing further along the plunger assembly. The leakage return conduit opening is located between the pumping chamber and the second sealing means.

The second sealing means implies an increased possibility to transport leaked fuel via the leakage return conduit.

Optionally, the second sealing means is obtained by means of a clearance between the plunger assembly and a portion of the pump block, preferably a metal portion of the pump block, the clearance preferably being within the range of 0.1 to 10 micrometres, more preferred within the range of 0.5 to 5 micrometres.

The above clearance implies a preferred implementation for achieving the second sealing means.

Optionally, the second sealing means comprises an elastomer and/or a plastics material with or without an energizer. Preferably, the second sealing means comprises an elastomer and/or a plastics material which is compatible with DME. As a non-limiting example, the second sealing means may comprise a perfluoroelastomer (FFKM) and/or a polytetrafluoroethylene (PTFE).

Optionally, the fuel pump assembly further comprises a bleed valve adapted to selectively provide a fluid communication, preferably via a return channel, between the suction channel and a source of fuel.

Optionally, the suction channel comprises a discharge port adapted to discharge fuel to the pumping chamber. The bleed valve and the metering valve are located on opposite sides of the discharge port.

Optionally, the suction channel comprises a discharge port adapted to discharge fuel to the pumping chamber. The metering valve and the discharge port are located on opposite sides of the bleed valve.

Optionally, when measured along an intended direction of flow in the suction channel, the bleed valve is located a first distance from the metering valve and the discharge port is located a second distance from the bleed valve. The second distance is smaller than the first distance.

Optionally, the fuel pump assembly comprises an inlet valve, preferably a spring-less inlet valve such as a disc valve, positioned between the suction channel and the pumping chamber, adapted to control the flow of fuel into the pumping chamber.

Optionally, the pumping chamber assumes a minimum volume when the plunger assembly is at a top position and the pumping chamber assumes a maximum volume when the plunger assembly is at a bottom position. The maximum volume is within the range of 10 to 30, preferably within the range of 12 to 15, times the minimum volume.

Optionally, the leakage return conduit comprises a leakage return cavity in the pump block, preferably the leakage return cavity having a circumferential extension in a circumferential direction and the leakage return cavity at least partially circumscribes the plunger assembly cavity and/or the pumping chamber in the circumferential direction.

The leakage return cavity according to the above implies that leaked fuel, upon its possible evaporation in the leakage return cavity, would impart more of the cooling effect due to evaporation onto the parts of the pumping system that contact the fuel and, consequently, suppress evaporation of fuel in the pumping chamber during the filling stroke of the plunger assembly. This would help improve the volumetric efficiency of the pump.

Optionally, the plunger assembly comprises a plunger and a tappet. The plunger assembly cavity comprises a plunger cavity portion, adapted to accommodate at least a portion of the plunger, and a tappet cavity portion, adapted to accommodate at least a portion of the tappet, wherein the fuel pump assembly comprises a drain conduit for draining fluid that has leaked past a portion of the plunger assembly, for instance past at least a portion of the plunger. The drain conduit comprises a drain conduit opening located in the tappet cavity portion.

Optionally, the plunger assembly comprises a force-transferring bearing for transferring forces from a camshaft to the plunger assembly.

Optionally, the fuel pump assembly comprises a feeding fuel pump assembly adapted to feed fuel to the pumping chamber.

Optionally, the feeding fuel pump assembly is located upstream of the metering valve in an intended direction of flow of the fuel.

A second aspect of the present disclosure relates to an internal combustion engine comprising a fuel pump assembly according to the first aspect of the present disclosure.

A third aspect of the present disclosure relates to a vehicle, preferably a heavy-duty vehicle, comprising a fuel pump assembly according to the first aspect of the present disclosure and/or an internal combustion engine according to the second aspect of the present disclosure.

A fourth aspect of the present disclosure relates to a method for pressurizing fuel using a fuel pump assembly. The fuel preferably comprises dimethyl ether (DME). The fuel pump assembly comprises a plunger assembly and a pump block defining a pumping chamber and a plunger assembly cavity. The fuel pump assembly comprises a metering valve and a suction channel located between the metering valve and the pumping chamber in an intended direction of flow of the fuel. The method comprises:

pressurizing the fuel in the pumping chamber by moving the plunger assembly at least partially in the plunger assembly cavity, and guiding leaked fuel, having leaked from the pumping chamber to the plunger assembly cavity, directly back to the suction channel.

A fifth aspect of the present disclosure relates to a fuel pump assembly for pressurizing fuel, the fuel preferably comprising dimethyl ether (DME). The fuel pump assembly comprising a plunger assembly and a pump block. The pump block defines a pumping chamber and a plunger assembly cavity in fluid communication with the pumping chamber. The plunger assembly is movable at least partially in the plunger assembly cavity towards and away from the pumping chamber. The plunger assembly comprises a plunger and a tappet wherein the cross-sectional area of the tappet is larger than the cross-sectional area of the plunger. The plunger assembly cavity comprises a tappet cavity portion, adapted to accommodate at least a portion of the tappet.

According to the fifth aspect of the present disclosure, the fuel pump assembly comprises a drain conduit with a drain conduit opening located in the tappet cavity portion.

A fuel pump assembly according to the fifth aspect of the present disclosure implies that fluid that has leaked passed the plunger may be handled in an efficient manner. Since the cross-sectional area of the tappet is larger than the cross-sectional area of the plunger, fluid that has leaked past the plunger enters a space, the cross-sectional area of which is larger than the cross-sectional area of the plunger. This in turn implies that leaked fluid may enter the drain conduit, even if the fluid has not leaked past a portion of the circumference of the plunger that is close to the drain conduit opening.

Optionally, the cross-sectional area of the tappet may be at least 2 times greater, preferably at least 5 times greater, more preferred at least 8 times greater, than the cross-sectional area of the plunger.

Optionally, the fuel pump assembly comprises a plunger cavity portion, adapted to accommodate at least a portion of the plunger, and a leakage return conduit with a first leakage return conduit opening located in the plunger cavity portion.

Optionally, the fuel pump assembly comprises a metering valve and a suction channel located between the metering valve and the pumping chamber in an intended direction of flow of the fuel. The leakage return conduit comprises a second leakage return conduit opening located in the suction channel.

Optionally, the leakage return conduit comprises a leakage return cavity in the pump block. Preferably the leakage return cavity has a circumferential extension in a circumferential direction and the leakage return cavity at least partially circumscribes a portion of the plunger assembly cavity and/or a portion of the pumping chamber in the circumferential direction.

Optionally, the plunger cavity portion comprises a leakage chamber at least partially surrounding the plunger. The leakage return conduit opening is located in the leakage chamber.

Optionally, the fuel pump assembly comprises a first sealing means for preventing fuel from escaping from the pumping chamber along the plunger assembly. The first sealing means is located between the pumping chamber and the leakage return conduit opening.

Optionally, the first sealing means is obtained by means of a clearance between the plunger and a portion of the pump block, preferably a metal portion of the pump block. The clearance preferably is within the range of 0.1 to 10 micrometres, more preferred within the range of 0.5 to 5 micrometres.

Optionally, the fuel pump assembly comprises a second sealing means for preventing fuel from escaping from the pumping chamber along the plunger assembly. The leakage return conduit opening is located between the pumping chamber and the second sealing means.

Optionally, the second sealing means is obtained by means of a clearance between the plunger and a portion of the pump block, preferably a metal portion of the pump block. The clearance preferably is within the range of 0.1 to 10 micrometres, more preferred within the range of 0.5 to 5 micrometres.

Optionally, the plunger assembly and the pump block are arranged such that a tappet seal is obtained for preventing fuel from passing between a portion of the tappet and the pump block.

By virtue of the tappet seal, prevention or at least a penetration reduction of leakage past the tappet, into e.g. a camshaft space, may be obtained in a simple and inexpensive manner. Limiting the penetration of leakage into the camshaft space may simplify collection and removal of leakage from the pump and may reduce unwanted interaction of leakage with other liquids, e.g. lubrication oil which is normally present in the camshaft space.

Optionally, the tappet seal is obtained by means of a clearance between the tappet and a portion of the pump block, preferably a metal portion of the pump block. The clearance preferably is within the range of 5 to 100 micrometres, more preferred within the range of 20 to 40 micrometres.

Optionally, the fuel pump assembly comprises an inlet valve, preferably a spring-less inlet valve such as a disc valve, positioned between the suction channel and the pumping chamber, adapted to control the flow of fuel into the pumping chamber.

Optionally, the pumping chamber assumes a minimum volume when the plunger assembly is at a top position and the pumping chamber assumes a maximum volume when the plunger assembly is at a bottom position. The maximum volume is within the range of 10 to 30, preferably within the range of 12 to 15, times the minimum volume.

Optionally, the plunger assembly comprises a force-transferring bearing for transferring forces from a camshaft to the tappet.

Optionally, the fuel pump assembly comprises a feeding fuel pump assembly adapted to feed fuel to the pumping chamber.

Optionally, the feeding fuel pump assembly is located upstream of the metering valve in an intended direction of flow of the fuel.

Optionally, the fuel pump assembly further comprises a bleed valve adapted to selectively provide a fluid communication, preferably via a return channel, between the suction channel and a source of fuel.

Optionally, the suction channel comprises a discharge port adapted to discharge fuel to the pumping chamber. The bleed valve and the metering valve are located on opposite sides of the discharge port.

Optionally, the suction channel comprises a discharge port adapted to discharge fuel to the pumping chamber. The metering valve and the discharge port are located on opposite sides of the bleed valve.

Optionally, when measured along an intended direction of flow in the suction channel, the bleed valve is located a first distance from the metering valve and the discharge port is located a second distance from the bleed valve. The second distance is smaller than the first distance.

Optionally, the plunger assembly is adapted to be driven by a driving member which is rotatably mounted in a housing which is connected to the pump block. The fuel pump assembly further comprises a lube oil supply line connected to the housing.

Optionally, the fuel pump assembly further comprises a lube oil reservoir outside the housing. The lube oil supply line provides a fluid communication between the lube oil reservoir and the housing. The fuel pump assembly further comprises a lube oil separator in fluid communication with the lube oil reservoir. The drain conduit is adapted to be in fluid communication with the lube oil separator.

Optionally, the drain conduit is connected to a valve, such as a solenoid valve, which in turn is connected to the lube oil separator. The valve is adapted to control the fluid communication between the drain conduit and the lube oil separator.

Optionally, the fuel pump assembly further comprises a second drain conduit. The second drain conduit is in fluid communication with the housing.

Optionally, the second drain conduit is in fluid communication with the valve.

Optionally, the lube oil supply line comprises a lube oil supply valve, preferably a check valve.

A sixth aspect of the present disclosure relates to an internal combustion engine comprising a fuel pump assembly according to the fifth aspect of the present disclosure.

A seventh aspect of the present disclosure relates to a vehicle, preferably a heavy-duty vehicle, comprising a fuel pump assembly in accordance with the fifth aspect of the present disclosure and/or an internal combustion engine according to the sixth aspect of the present disclosure.

BRIEF DESCRIPTION OF THE DRAWINGS

With reference to the appended drawings, below follows a more detailed description of embodiments of the invention cited as examples.

In the drawings:

FIG. 5 schematically illustrates a fuel pump assembly for pressurizing fuel according to another embodiment of the present invention;

FIG. 9 is a flowchart illustrating an embodiment of a method for pressurizing fuel.

It should be noted that the appended drawings are not necessarily drawn to scale and that the dimensions of some features of the present invention may have been exaggerated for the sake of clarity.

DETAILED DESCRIPTION OF PREFERRED EMBODIMENTS

Figure 1:
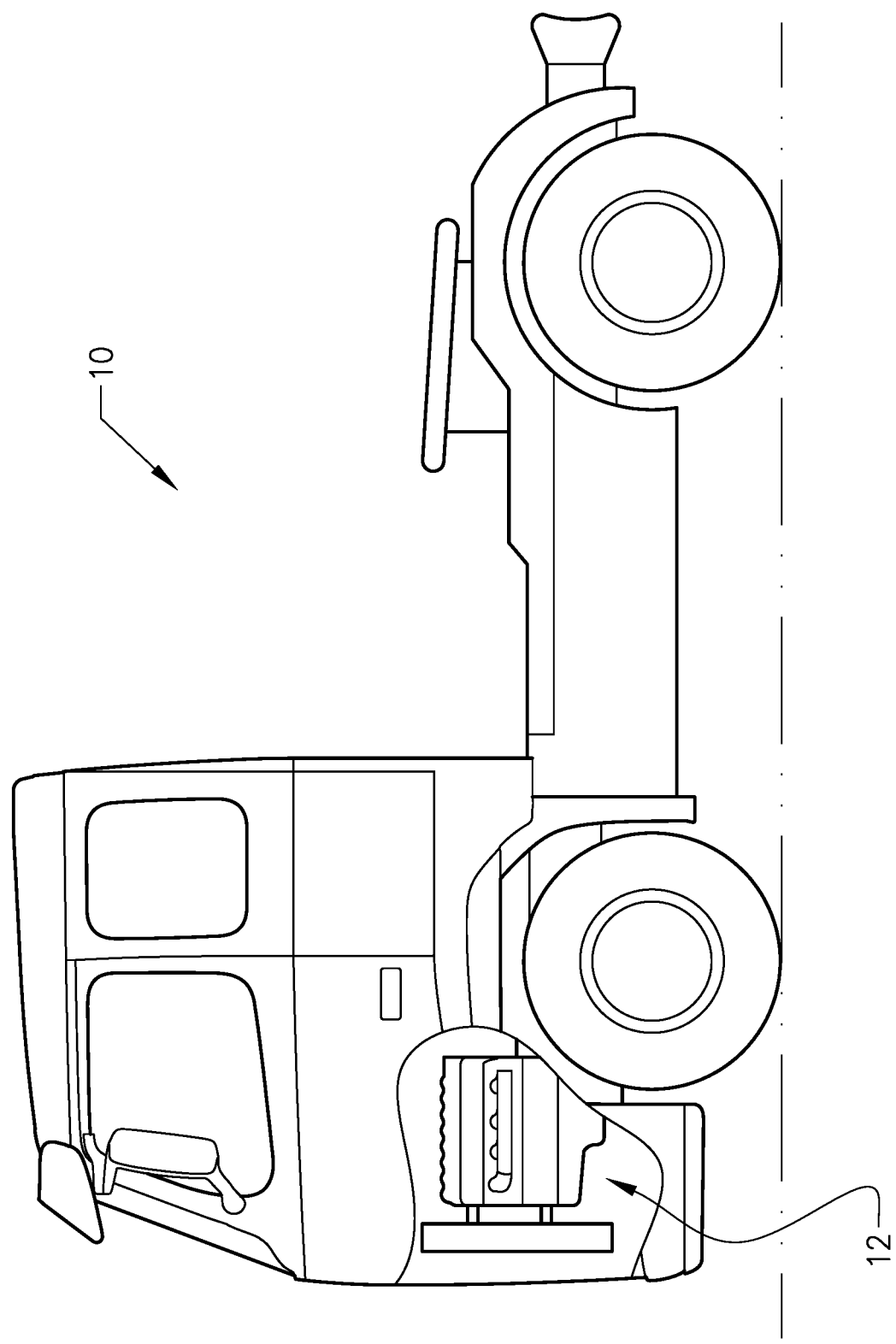
FIG. 1 illustrates a truck comprising an internal combustion engine.

The invention will below be described for a vehicle in the form of a truck 10 such as the one illustrated in FIG. 1. The truck 10 should be seen as an example of a vehicle which could comprise a fuel pump assembly and/or an internal combustion engine according to the present invention. However, the fuel pump assembly and/or an internal combustion engine of the present invention may be implemented in a plurality of different types of objects, e.g. other types of vehicles. Purely by way of example, the fuel pump assembly and/or an internal combustion engine could be implemented in a truck, a tractor, a car, a bus, a work machine such as a wheel loader or an articulated hauler or any other type of construction equipment. The truck 10 comprises an internal combustion engine 12.

The internal combustion engine 12 may be powered by a high-volatility fuel, such as dimethyl ether (DME) or a blend comprising dimethyl ether. Such a high-volatility fuel generally has to be pressurized to a relatively high pressure prior to injection into one or more combustion chambers of the engine 12. To this end, a fuel pump assembly may be used.

Figure 2A:
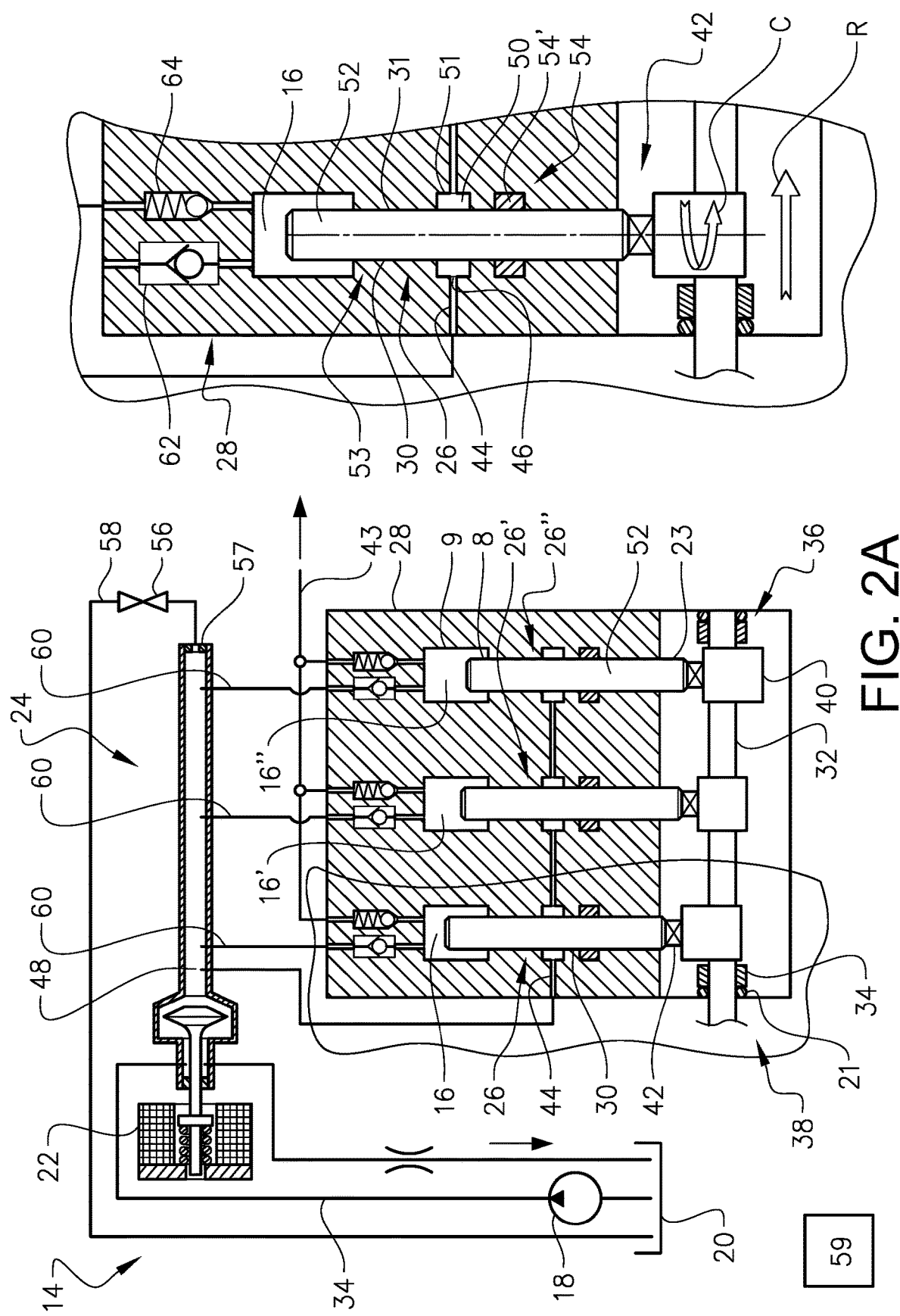
FIG. 2A schematically illustrates a fuel pump assembly for pressurizing fuel according to an embodiment of the present invention.

FIG. 2A illustrates an embodiment of a fuel pump assembly 14 for pressurizing fuel. To this end, the fuel pump assembly 14 comprises a pumping chamber 16. In fact, the FIG. 2A embodiment comprises three pumping chambers 16, 16', 16". The fuel preferably comprises a low viscosity fuel such as dimethyl ether (DME).

As may be gleaned from FIG. 2A, the embodiment of the fuel pump assembly 14 illustrated therein comprises a feeding fuel pump assembly 18 adapted to feed fuel to the pumping chamber 16. The feeding fuel pump assembly 18 preferably comprises a pump and is in fluid communication with a source of fuel 20, such as a fuel tank. Purely by way of example, the feeding fuel pump assembly 18 typically increases the fuel pressure to a pressure within the range of about 1-40 bar over the pressure present in the fuel tank, preferably however within the range of 2-8 bar.

Moreover, FIG. 2A illustrates that the fuel pump assembly 14 comprises a metering valve 22 and a suction channel 24 located between the metering valve 22 and the pumping chamber 16 in an intended direction of flow of the fuel. An inlet valve may be installed between the suction channel 24 and the pumping chamber 16. In FIG. 2A, the feeding fuel pump assembly 18 is located upstream of the metering valve 22 in an intended direction of flow of the fuel. The metering valve 22 controls the amount of fuel that is allowed to enter the suction channel 24. The suction channel 24 functions as a fuel source for the pumping chambers 16.

Moreover, the fuel pump assembly 14 comprises a plunger assembly 26 and a pump block 28. The FIG. 2A embodiment of the fuel pump assembly 14 comprises three plunger assemblies 26, 26', 26". The pump block 28 defines the pumping chamber 16 and a plunger assembly cavity 30. The plunger assembly cavity 30 is such that it is adapted to accommodate a plunger assembly, or at least a portion thereof. Purely by way of example, the plunger assembly cavity 30 is such that when the plunger assembly 26 is accommodated therein, a cavity gap is obtained between the plunger assembly 26 and the cavity wall, which wall generally is constituted by a portion of the pump block 28. As a non-limiting example, the cavity gap may be within the range of 0.01-1 millimetres, measured in diameter differences. Alternatively, the cavity gap may be approximately 0.2 millimetres.

The FIG. 2A embodiment of the fuel pump assembly 14 comprises a pumping chamber and a plunger assembly cavity for each one of the plunger assemblies 26, 26', 26". The pump block 28 may comprise a plurality of block portions (not shown in FIG. 2A) although the implementation of the pump block 28 illustrated in FIG. 2A is made in one piece.

As a non-limiting example, a pump block may comprise a plurality of plunger assembly accommodating components (not shown), for instance one for each plunger assembly, and each one of the plunger assembly accommodating components may be fixedly attached to a pump block portion. Purely by way of example, a plunger assembly and a plunger assembly accommodating component may be provided as a separate sub-assembly that is connected to a pump block 28 portion.

In the FIG. 2A embodiment, each one of the plunger assemblies 26, 26', 26" is driven by a driving member 32 which in FIG. 2A is exemplified as a rotating camshaft. The driving member 32, which may be rotatably mounted in bearings 34, 36 in a housing 38 which is connected to the pump block 28, comprises a plurality of cams 40 for engagement with a corresponding plunger assembly 26, 26', 26". The plunger assembly 26, 26', 26" is arranged to expand and contract the pumping chamber 16 in a reciprocating motion that is caused by a corresponding cam 40 of the camshaft 32 in order to pressurize the fuel in the pumping chamber 16. As a non-limiting example, each plunger assembly may comprise a force-transferring bearing 42 for transferring forces from the camshaft 32 to a portion of the plunger assembly 26. A resilient means (not shown) may be employed to bias the plunger assembly, or at least a portion thereof, towards the camshaft and/or bearing.

As has been intimated hereinabove, the plunger assembly 26 is movable at least partially in the plunger assembly cavity 30 towards and away from the pumping chamber 16. As such, the plunger assembly 26 may be referred to as a reciprocating assembly adapted to be imparted a reciprocating motion relative the pump block 28. The FIG. 2A embodiment comprises three plunger assemblies 26, 26', 26". However, embodiments of the fuel pump assembly 14 may include only one or two plunger assemblies whereas other embodiments may comprise more than three plunger assemblies. Moreover, in the FIG. 2A embodiment, the plunger assemblies 26, 26', 26" are moved with a phase difference of 360° divided by the number of plunger assemblies. As such, in the FIG. 2A embodiment, the three plunger assemblies 26, 26', 26" are moved with a phase difference of 120°.

The thus pressurized fuel is then fed to a fuel injection conduit 43 for further transport to one or more fuel injectors (not shown). Purely by way of example, the fuel pressure within the fuel injection conduit 42 may be within the range of 100-350 bar when the engine is running and depending on engine speed, but fuel pressure up to 600 bar or more may be used.

When fuel is pressurized in the pumping chamber 16, by virtue of an upward motion of the plunger assembly 26 such that a portion thereof is moved into the pumping chamber 16, a certain amount of fuel could leak past a portion of the plunger assembly 26 in a direction away from the pumping chamber 16. Such a leakage may be occasioned by the fact that there may be a large pressure difference between the pressure of the fuel in the pumping chamber 16 and the pressure outside the pump block 28.

In order to handle such a leakage, the fuel pump assembly 14 comprises a leakage return conduit 44, with a first leakage return conduit opening 46 in fluid communication with the plunger assembly cavity 30, adapted to return fuel that has leaked from the pumping chamber 16. Moreover, FIG. 2A illustrates that the leakage return conduit 44 comprises a second leakage return conduit opening 48 located in the suction channel 24.

As has been intimated hereinabove, the suction channel 24 contains few components vulnerable to deposits generated by the fuel. Also, conditions that exist in the suction channel 24 may suppress formation of fuel deposits in the parts of it that may impact the performance of the fuel pump assembly. As follows from the above description, rather than being returned to a portion of the fuel pump assembly 14 that has a low pressure, fuel that has leaked past the plunger assembly 26 is in the FIG. 2A embodiment returned to the suction channel 24. This in turn implies an appropriately low risk for deposits of returned leaked fuel in the fuel supply system as compared to prior art systems wherein leaked fuel is instead recirculated to portions of a fuel supply system that have a lower pressure, e.g. back to a fuel tank.

In order to present features of the fuel pump assembly 14 in an expedient manner, characteristics of a plunger assembly and its corresponding plunger assembly cavity will be presented with reference to the first plunger assembly 26.

However, it should be noted that each one of the features discussed hereinbelow with reference to the first plunger assembly 26 are equally applicable to each one of the other plunger assemblies of a fuel pump assembly 14, such as the second and third plunger assemblies 26', 26" illustrated in FIG. 2A. For instance, as illustrated in the FIG. 2A embodiment, the leakage return conduit 44 may be connected to the plunger assembly cavity of each one of the plunger assemblies 26, 26', 26".

As may be gleaned from FIG. 2A, the first leakage return conduit opening 46 may be located in the plunger assembly cavity 30. Moreover, FIG. 2A also illustrates an implementation of the plunger assembly cavity 30 which comprises a leakage chamber 50 at least partially surrounding the plunger assembly 26. The first leakage return conduit opening 46 is located in the leakage chamber 50. The leakage chamber 50 may collect leaked fuel that is to enter the leakage return conduit 44.

In FIG. 2A, the plunger assembly cavity portion 30 is defined by a plunger assembly cavity portion wall 31 and the leakage chamber 50 is defined by a leakage chamber wall 51. Purely by way of example, the cross-sectional area of the leakage chamber 50 is at least 5% greater than the cross-sectional area of a portion of the plunger assembly cavity portion 30 which is located adjacent to the leakage chamber 50.

The FIG. 2A implementation of the plunger assembly 26 comprises a plunger 52 and the leakage chamber 50 at least partially surrounding the plunger 52.

Moreover, FIG. 2A illustrates that the fuel pump assembly 14 may comprise a first sealing means 53 for preventing fuel from escaping from the pumping chamber 16 along the plunger assembly 26. Purely by way of example, the first sealing means may be obtained by means of a clearance between the plunger assembly 26 and a portion of the pump block 28, preferably a metal portion of the pump block. In the FIG. 2A embodiment, the first sealing means may be obtained by means of a clearance between the plunger 52 and a portion of the pump block 28, preferably a metal portion of the pump block. The clearance is preferably within the range of 0.1 to 10 micrometres, more preferred within the range of 0.5 to 5 micrometres, measured in diameter differences.

For implementations of the first sealing means in which the plunger assembly 26 and/or the plunger assembly cavity portion 30 does not have a circular cross-section, the clearance may be determined by determining a first diameter of the smallest circle that envelopes the plunger assembly cavity portion 30 and a second diameter of the smallest circle that envelopes the plunger assembly 26. The clearance is then the difference between the first and the second diameters.

In the FIG. 2A embodiment, the first leakage return conduit opening 46 is located downstream of the first sealing means 53. In other words, in the FIG. 2A embodiment, the first sealing means 53 is located between the first leakage return conduit opening 46 and the pumping chamber 16.

Furthermore, as is indicated in FIG. 2A, the fuel pump assembly 14 may comprise a second sealing means 54 for preventing fuel that has passed the first sealing means 53 from passing further along the plunger assembly 26. The leakage return conduit opening 46 is located between the pumping chamber 16 and the second sealing means 54.

Purely by way of example, the second sealing means 54 may be obtained by means of a clearance between the plunger assembly 26 and a portion of the pump block 28, preferably a metal portion of the pump block, the magnitude of which may be approximately the same as the above-discussed clearance example for obtaining the first sealing means 53, i.e. a clearance within the range of 0.1 to 10 micrometres, more preferred within the range of 0.5 to 5 micrometres.

Instead of, or in addition to, the above-discussed clearance, the second sealing means 54 may comprise, or even be constituted by, a material that has appropriate sealing characteristics. Purely by way of example, the second sealing means 54, when comprising a separate component as is exemplified by reference numeral 54' in FIG. 2A, may comprise a DME-compatible elastomer such as FFKM and/or a plastic-like material such as PTFE, with or without an energizer.

FIG. 2A illustrates an embodiment of the fuel pump assembly 14 which further comprises a bleed valve 56 adapted to selectively provide a fluid communication, preferably via a return channel 58, between the suction channel 24 and a source of fuel 20, such as the FIG. 2A tank 20. The bleed valve 56 may be used for evacuating fuel vapour from the suction channel 24 and preferably constitutes a relief valve with an opening pressure that may be lower than the pressure upstream of the metering valve. As another non-limiting example, the bleed valve 56 may be controlled, e.g. electronically controlled, to open when the suction channel 24 is likely to contain vapour, for instance when a difference between the engine temperature and the ambient temperature exceeds a predetermined threshold value and is optionally combined with another specific condition of engine.

Since, as noted above, the DME leakage tends to vaporize quickly and since the leakage in the present invention is returned to the suction channel 24, in certain operating conditions proper supply of liquid fuel to the pumping chamber 16 may be disrupted unless the vapour is removed from the suction channel 24. The provision of the bleed valve 56 is then a means of achieving such vapour removal from the suction channel 24. If those conditions arise and the pump assembly 14 begins to lose volumetric efficiency due to excessive vapour being drawn into the pumping chamber instead of the liquid fuel, then its output pressure would tend to drop. In such a condition, the pressure drop may be compensated for by increasing the opening of the metering valve 22. Purely by way of example, such compensation may be done by an engine management system 59. This would cause the pressure in the suction channel 24 to increase, which would eventually force the bleed valve to open and remove the vapour from the suction channel 24, thus restoring the output of the pump assembly.

Purely by way of example, the bleed valve 56 may comprise at least one of the following valve types: a non-return valve, an electrically controlled valve and a relief valve.

The suction channel 24 generally comprises a discharge port 60 adapted to discharge fuel to the pumping chamber 16. The FIG. 2A implementation of the suction channel 24 comprises a discharge port 60 for each one of the three pumping chambers 16, 16', 16". Each one of the discharge ports 60 is preferably selectively in fluid communication with its corresponding pumping chamber 16, 16', 16" via an inlet valve 62. Preferred implementations of the inlet valve 62 are discussed hereinbelow. As may be gleaned from FIG.

2A, the bleed valve 56 and the metering valve 22 are located on opposite sides of at least one of, preferably all of, the discharge ports 60. In FIG. 2A, the bleed valve 56 is in communication with the suction channel 24 via a bleed port 57 and the bleed port 57 and the metering valve 22 are located on opposite sides of at least one of, preferably all of, the discharge ports 60.

Purely by way of example, the inlet valve 62 may be essentially a one-way valve, enabling the pressure to be created in the pumping chamber 16 during a pumping stroke of the plunger assembly 26, and a new charge of fuel be drawn from the suction channel 24 via the discharge port 60 into the pumping chamber 16 during the filling stroke of the plunger assembly 26.

Figure 2B:
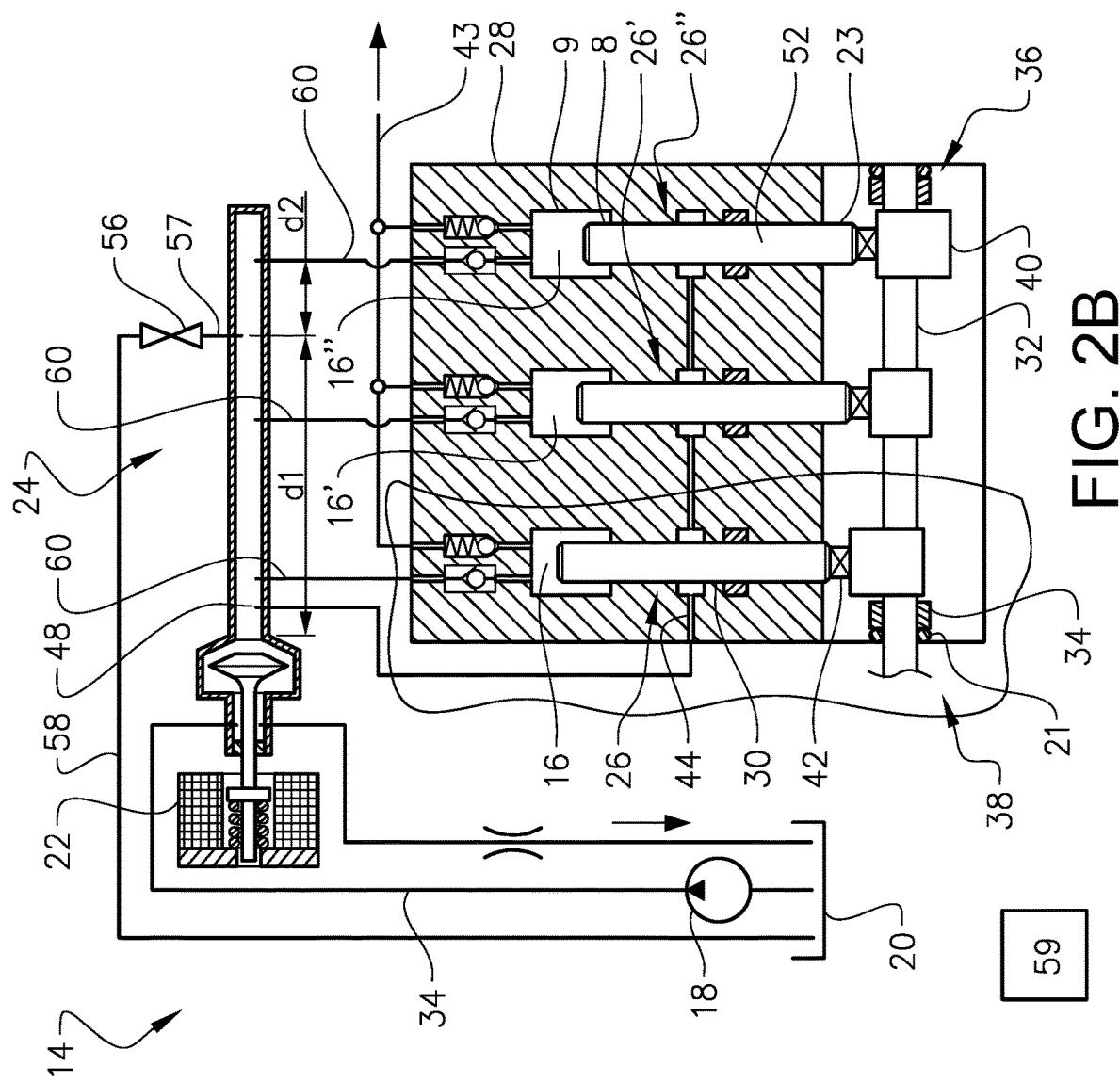
FIG. 2B schematically illustrates a fuel pump assembly for pressurizing fuel according to a further embodiment of the present invention.

FIG. 2B illustrates a further embodiment of the fuel pump assembly 14 in which the metering valve 22 and the discharge port 60 are located on opposite sides of the bleed valve 56. In other words, in the FIG. 2B embodiment, the bleed valve 56 is located upstream of at least one discharge port 60, viz the rightmost discharge port 60 in FIG. 2B. Moreover, in the FIG. 2B embodiment, the bleed valve 56 is located downstream two discharge ports 60. In FIG. 2B, the bleed valve 56 is in communication with the suction channel 24 via a bleed port 57.

Moreover, in the FIG. 2B embodiment, when measured along an intended direction of flow in the suction channel 24, the bleed valve 56 is located a first distance d1 from the metering valve 22 and the discharge port 60 is located a second distance d2 from the bleed valve 56. The second distance d2 is smaller than the first distance d1. In embodiments such as the one illustrated in FIG. 2B, the first and second distances d1, d2 are preferably measured between the metering valve 22 and the bleed port 57 as well as the distance between the bleed port 57 and the discharge port 60, respectively.

The FIG. 2B position of the bleed valve 56 relative to the discharge port(s) 60 and the inlet valve(s) allows for a quicker removal of vapour and a faster restoration of proper filling of the pumping chambers with liquid fuel, as there is then a shorter distance and thus a smaller volume of vapour that would be drawn into the pumping chamber before liquid fuel starts to reach it.

Another advantageous aspect of the FIG. 2B relative positioning of the bleed valve 56 and the discharge ports 60 with the inlet valves is that, in case the operating conditions made the pump assembly 14 very hot, the excessive flow of fresh fuel from the metering valve 22 to the bleed valve 56 would cool a longer portion of the suction channel and therefore better help to suppress vapour re-appearance in it.

In each one of the FIG. 2A and FIG. 2B embodiments, the fuel pump assembly 14 comprises a spring-less inlet valve 62, preferably a disc valve, adapted to control the flow of fuel into the pumping chamber 16. The spring-less inlet valve 62 provides a selective fluid communication between the suction channel 24 and the pumping chamber 16. Moreover, as is indicated in FIG. 2, the fuel pump assembly 14 comprises an outlet valve 64, which may be a spring-biased outlet valve, such as a spring-biased ball valve, which selectively connects the pumping chamber 16 to the fuel injection conduit 42.

A spring-less inlet valve 62 implies a reduction of the absolute volume of the suction channel 24 as well as of the pumping chamber 16. It also implies that the configuration of the suction channel allows an easier and/or more effective bleeding of any vapour bubbles that may form at various hot spots along the channel.

In particular, a spring-less inlet valve 62 implies that a minimum volume of the pumping chamber 16 may be relatively low. A valve, such as a check-valve, that comprises a spring generally comprises a volume accommodating the spring and such a volume may form part of a minimum volume of the pumping chamber 16. The use of a spring-less valve removes the need for a specific spring enclosing volume and thus implies that the minimum volume may be reduced. The pumping chamber 16 assumes the minimum volume when the plunger assembly 26 is at a top position (also referred to as a top dead centre) and the pumping chamber 16 assumes a maximum volume when the plunger assembly 26 is at a bottom position (also referred to as a bottom dead centre). The maximum volume may be within the range of 10 to 30, preferably within the range of 12 to 15, times the minimum volume.

The volume reduction of the suction channel 24 implies a reduction of the dwell time of fuel therein. The higher the fuel exchange rate, the lower the temperature of the wall(s) of the suction channel 24 and the fuel therein. This in turn may allow operation of a hotter engine at a lighter load.

Moreover, the reduction of the pumping chamber 16 volume may be preferred since any fuel that has not been displaced via the outlet valve 64 may be vaporized on a downward stroke of the plunger assembly 26, both because the fuel has been heated up during compression and because of the subsequent expansion. The more fuel that is left to vaporize, the longer the stroke that would be needed before the pressure in the pumping chamber 16 is reduced to below the pressure in the suction channel 24 by the opening pressure of the inlet valve 62, when an inlet of new fuel becomes possible. In that case, volumetric efficiency of the pump assembly 14 would be lower, compared to a pump assembly with the pumping chamber volume minimized by the use of a spring-less inlet valve. The reduction of the volume there is achieved because the absence of the return spring of the valve implies a more compact valve that requires less room for installation. Naturally, other means of reducing the dead volume of the pumping chamber, such as reducing the minimum distance between the plunger assembly and the inlet valve in the TDC position, reducing crevice volume etc., would also be working to improve its volumetric efficiency in hotter operating conditions.

Figure 3:
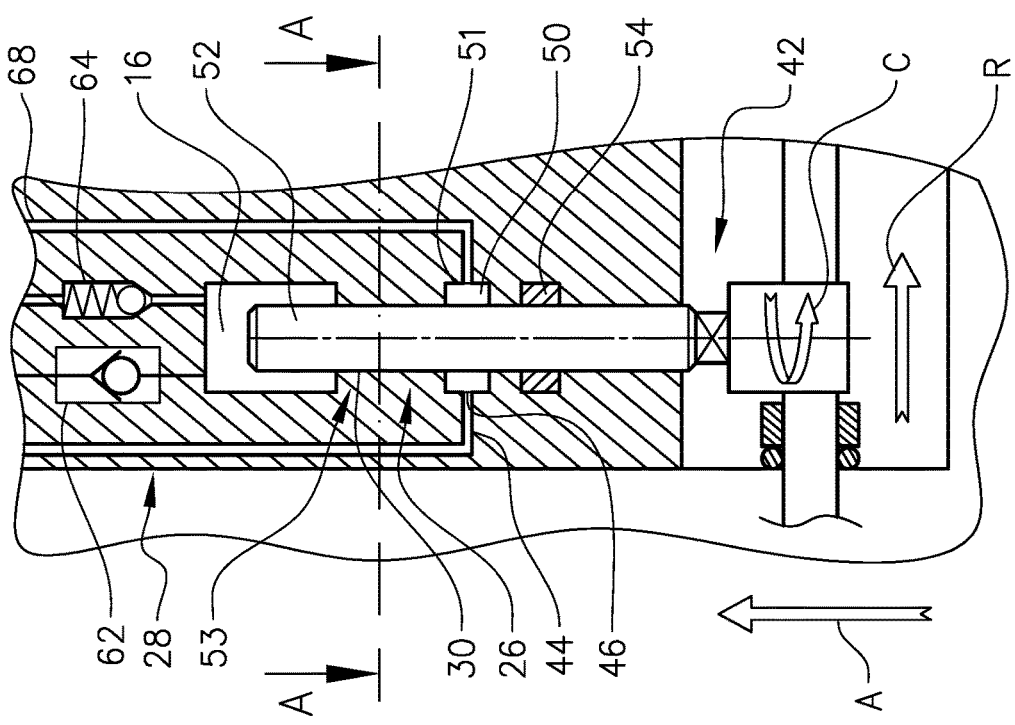

FIG. 3 illustrates a portion of the fuel pump assembly 14 in which the leakage return conduit 46 comprises a leakage return cavity 68 in the pump block 28. Moreover, in the FIG. 3 implementation, the leakage return cavity 68 has a circumferential extension in a circumferential direction C and the leakage return cavity 68 at least partially circumscribes a portion of the plunger assembly cavity 30 and/or a portion of the pumping chamber 16 in the circumferential direction C. The FIG. 3 leakage return cavity 68 also has an extension in an axial direction A, viz a direction that is substantially parallel to the longitudinal extension of the plunger assembly 26.

Figure 4A:
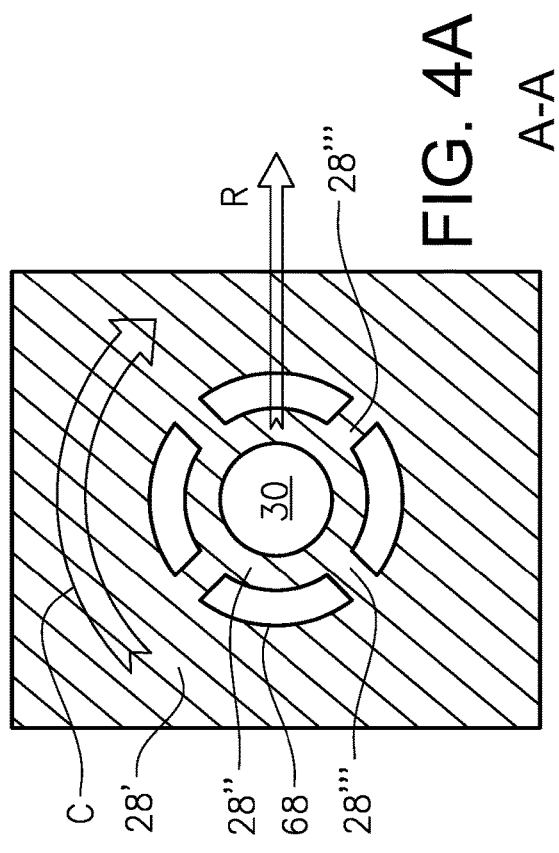
FIGS. 3 to 4B illustrate a portion of an embodiment of a fuel pump assembly.

FIG. 4A illustrates a cross-section of a portion of the FIG. 3 fuel pump assembly 14. As may be gleaned from FIG. 4, the leakage return cavity 68 substantially circumscribes the plunger assembly cavity 30. Moreover, the portions of the pump block 28 that are located inwards and outwards of the leakage return cavity 68, these portions being indicated by reference numerals 28' and 28", respectively, in FIG. 4, are connected to one another by one or more bridging portions 28'''. The FIG. 4 implementation comprises four bridging portions 28'''. Purely by way of example, at least one of the bridging portions 28''' has an extension along at least a radial direction R.

Figure 4B:
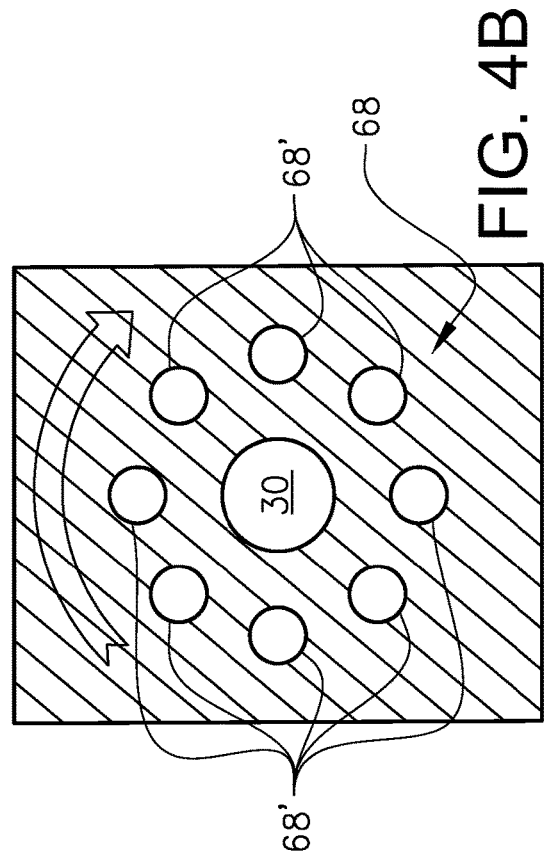

FIG. 4B illustrates a cross-section of another implementation of the leakage return cavity 68. In FIG. 4B, the leakage return cavity 68 comprises a plurality of leakage return cavity portions 68' together forming the cavity 68. In another embodiment, at least a part of the leakage return cavity 68 is arranged as a continuous annular volume surrounding a portion of the plunger assembly 26.

FIG. 5 illustrates another embodiment of the present invention. As compared to the previously discussed embodiments of the fuel pump 14 that have been discussed hereinabove with reference to each one of FIG. 2 to FIG. 4, like reference numerals denote like features. As such, FIG. 5 illustrates and embodiment of a fuel pump assembly 14 for pressurizing fuel, the fuel preferably comprising dimethyl ether (DME) or a blend comprising dimethyl ether.

The fuel pump assembly comprising a plunger assembly 26 and a pump block 28. The pump block 28 defines a pumping chamber 16 and a plunger assembly cavity 30 in fluid communication with the pumping chamber 16. The plunger assembly 26 is movable at least partially in the plunger assembly cavity 30 towards and from the pumping chamber 16. The plunger assembly 26 comprises a plunger 52 and a tappet 72 wherein the cross-sectional area of the tappet 72 is larger than the cross-sectional area of the plunger 52.

Purely by way of example, the plunger 52 and the tappet 72 may be separate components. As another non-limiting example, the plunger 52 and the tappet 72 may form a unitary component.

The plunger assembly cavity comprises a plunger cavity portion 73, adapted to accommodate at least a portion of the plunger 52, and tappet cavity portion 74, adapted to accommodate at least a portion of the tappet 72.

Purely by way of example, the plunger cavity portion 73 is such that when the plunger 52 is accommodated therein, a cavity gap is obtained between the plunger 52 and the cavity wall, which wall generally is constituted by a portion of the pump block 28. As a non-limiting example, the cavity gap may be within the range of 0.01-1 millimetres, measured in diameter differences. Alternatively, the cavity gap may be approximately 0.2 millimetres.

In a similar vein, the tappet cavity portion 74 is such that when the tappet 72 is accommodated therein, a cavity gap is obtained between the tappet 72 and the cavity wall, which wall generally is constituted by a portion of the pump block 28. As a non-limiting example, the cavity gap may be within the range of 0.01-1 millimetres, measured in diameter differences. Alternatively, the cavity gap may be approximately 0.2 millimetres.

Moreover, in the FIG. 5 embodiment, the fuel pump assembly 14 comprises a drain conduit 76 for draining fluid that has leaked past a portion of the plunger assembly 26. The drain conduit 76 comprises a drain conduit opening 78 located in the tappet cavity portion 74.

As may be gleaned from FIG. 5, fluid that has passed the plunger 52 enters a space 75 which is at least a portion of the tappet cavity portion 74. The size and shape of the space 75 may vary in time but in the temporal instant illustrated in FIG. 5, the space 75 is outwardly delimited by the cavity wall of the tappet cavity portion 74 and inwardly delimited by the plunger 52. As such, fluid that has leaked past the plunger 52 and that has entered the space 75 may thereafter enter the drain conduit 76. As such, the fact that the drain conduit opening 78 is located in the tappet cavity portion 74 implies that a leaked fluid may be drained to the drain conduit 76 without the use of a dedicated drain chamber (not shown) of the plunger cavity portion 73 and/or the tappet cavity portion 74. As may be gleaned from FIG. 5, the space 75 may provide a fluid communication between a portion of the tappet 72, such as the top of the tappet 72, and the drain conduit opening 78.

By virtue of the fact that the tappet 72 has a larger cross-sectional area than the plunger 52, the tappet 72 has a tappet top surface 80 at least partially facing the pumping chamber 16. Thus, when the tappet 72 moves in the tappet cavity portion 74, the tappet top surface 80 may act as a pump cylinder top surface and thus increase the pressure in the tappet cavity portion 74. This may in turn facilitate the removal of leaked fluid from the tappet cavity portion 74 via the drain conduit 76.

Purely by way of example, and as is illustrated in FIG. 5, the drain conduit 76 may be connected to a valve 77, such as a solenoid valve, which controls the fluid communication between the drain conduit 76 and a leaked fuel receiver (not shown). Moreover, though purely by way of example, the valve 77 may be closed as the tappet 72 moves downwards in order to prevent the tappet drawing fluid from the drain conduit 76.

Purely by way of example, such a leaked fuel receiver may form part of the fuel injection system such that the leaked fuel is fed to one or more of the combustion chambers (not shown) of the internal combustion engine (not shown in FIG. 5). Instead of, or in addition to being fed to the fuel injection system, the leaked fuel may be forwarded to an exhaust gas after-treatment arrangement (not shown), to a leaked fuel container (not shown) or to the ambient environment. As a non-limiting example, the solenoid valve 77 may be controlled by a control unit 79. An oil separator may be included in the path between drain conduit 76 and the leaked fuel receiver. The path between the drain conduit 76 and the leaked fuel receiver may be partly arranged in the form of a through-hole in a pump driveshaft and/or various clearances in the mechanism, for example clearances in the gears or splines of a shaft, such that for instance the fuel leakage together with excess lubrication oil is transported along that path and via said through-hole from the pump assembly into the engine crankcase, where the existing engine's blow-by gas oil separation means may work to remove lubrication oil before the blow-by including the fuel leakage in the form of vapour is delivered to the engine combustion system.

As a non-limiting example, and as is schematically indicated in FIG. 5, the drain conduit 76 may be connected to each tappet cavity portion of the fuel pump assembly 14.

In the FIG. 5 embodiment, the plunger assembly 26 and the pump block 28 are arranged such that a tappet seal 82, or a tappet sealing means, is obtained for preventing fuel from passing between a portion of the tappet 72 and the pump block 28. Such a tappet seal 82 may further enable the removal of leaked fluid from the tappet cavity portion 74 via the low pressure leakage return conduit 76.

Purely by way of example, the tappet seal 82 may obtained by means of a clearance between the tappet 72 and a portion of the pump block 28, preferably a metal portion of the pump block 28. The clearance preferably is within the range of 5 to 100 micrometres, more preferred within the range of 20 to 40 micrometres, measured in diameter differences.

Figure 6:
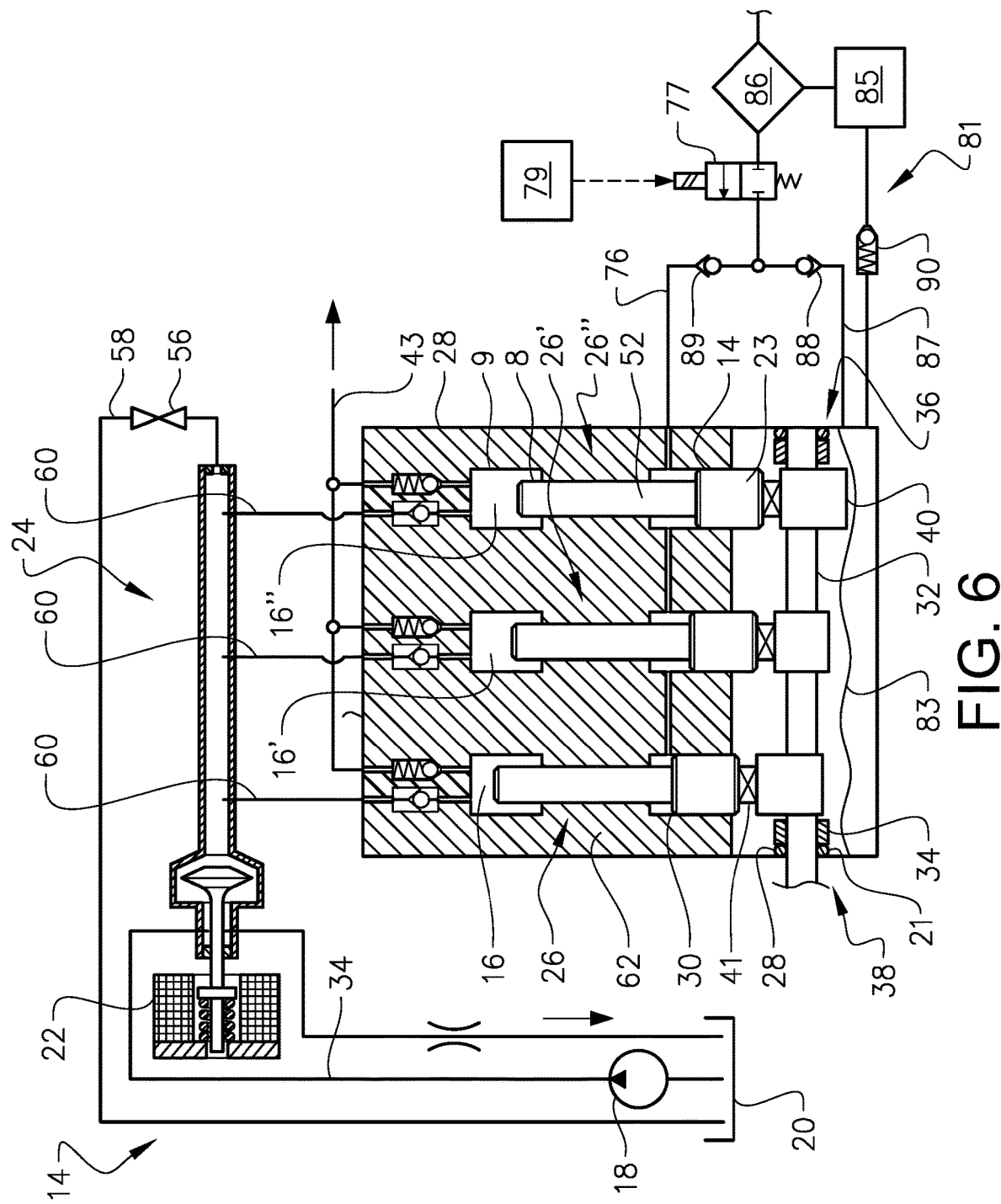
FIG. 6 schematically illustrates a fuel pump assembly for pressurizing fuel according to a further embodiment of the present invention.

FIG. 6 illustrates an embodiment of the fuel pump assembly 14 that is similar to the FIG. 5 embodiment. As has been presented hereinabove with reference to FIG. 2A, in the FIG. 6 embodiment, the plunger assembly 26 is adapted to be driven by a driving member 32 which is rotatably mounted in a housing 38 which is connected to the pump block 28. In fact, in the FIG. 6 embodiment, each one of the plunger assemblies 26, 26', 26" is adapted to be driven by a driving member 32 which is rotatably mounted in a housing 38 which is connected to the pump block 28. Purely by way of example, and as is indicated in FIG. 6, the driving member 32 may be rotatably mounted in bearings 34, 36 in the housing 38.

Moreover, the FIG. 6 fuel pump assembly 14 further comprises a lube oil supply line 81 connected to the housing 38. Through the lube oil supply line 81, lube oil may be fed to the housing 38 such that the lube oil for instance reaches a lube oil fill level 83 within the housing 38. The lube oil is adapted to lubricate components, such as the driving member 32, the plunger assemblies 26, 26', 26' and possibly also the contact surfaces between such components.

The FIG. 6 embodiment also comprises a lube oil reservoir 85 outside the housing 38. Purely by way of example, the lube oil reservoir 85 may be a lube oil tank. The lube oil supply line 81 provides a fluid communication between the lube oil reservoir 85 and the housing 38.

Moreover, as is indicated in FIG. 6, the fuel pump assembly 14 may further comprise a lube oil separator 86 in fluid communication with the lube oil reservoir 85. The drain conduit 76 may be adapted to be in fluid communication with the lube oil separator 86. As such, in the event that leaked fuel drained from the tappet cavity portion 74 comprises lube oil, the lube oil may be separated before the leaked fuel is guided to e.g. a leaked fuel receiver.

Moreover, as has been discussed hereinabove in relation to FIG. 5, the drain conduit 76 may be connected to a valve 77, such as a solenoid valve. The valve 77 may in turn be connected to the lube oil separator 86. The valve 77 is adapted to control the fluid communication between the drain conduit 76 and the lube oil separator 86. As a non-limiting example, the valve 77 may be controlled by a control unit 79.

Purely by way of example, the control unit 79 may control the valve 77 so as to be open, i.e. allow a fluid communication between the drain conduit 76 and the lube oil separator 86, when the fuel pump assembly 14 is active, i.e. when the plunger assemblies 26, 26', 26' are moving towards and away from the corresponding pumping chamber 16, 16', 16". Moreover, though again purely by way of example, the control unit 79 may control the valve 77 so as to be closed, i.e. prevent a fluid communication between the drain conduit 76 and the lube oil separator 86, when the fuel pump assembly 14 is inactive, i.e. when the plunger assemblies 26, 26', 26' are not moving towards and away from the corresponding pumping chamber 16, 16', 16".

Generally, the fuel pump assembly 14 is active when the internal combustion engine (not shown) receiving fuel from the fuel pump assembly 14 is active. Moreover, the fuel pump assembly 14 is generally inactive when the internal combustion engine (not shown) receiving fuel from the fuel pump assembly 14 is inactive.

The FIG. 6 embodiment further comprises a second drain conduit 87 in fluid communication with the housing 38. The second drain conduit 87 may be used for removing fuel that has leaked into the housing 38, for instance via the tappet 72, as well as for removing excess oil supplied via the lube oil supply line 81.

Moreover, as a non-limiting example, the second drain conduit 87 may be in fluid communication with the valve 77. In order the reduce the risk of having a fluid transport between the tappet cavity portion 74 and the housing 38 via the drain conduit 76 and the second drain conduit 87, each one of the drain conduit 76 and the second drain conduit 87 may comprise a check valve 88, 89 allowing fluid flow in a direction towards the valve 77 but preventing fluid flow in the opposite direction. Instead of, or in addition to, the check valves 88, 89, embodiments of the fuel pump assembly 14 may comprise two valves (not shown), a first valve connected to the drain conduit 76 and a second valve connected to the second drain conduit 87. In such an embodiment, it is envisioned that only the second valve needs to be connected to the lube oil separator 86 since the risk that lube oil has traveled all the way up to the tappet cavity portion 74 from the housing 38 is generally relatively low.

Additionally, the lube oil supply line 81 may comprise a lube oil supply valve 90 which for instance may be a check valve, for reducing the risk of fluid leaving the housing 38 via the lube oil supply line 81.

It should be noted that the above features that have been presented hereinabove in relation to FIG. 6 may be incorporated into any one of the other embodiments of the fuel pump assembly 14 that are presented hereinabove or hereinbelow.

Generally, for a fuel pump assembly 14 that comprises a housing 38, such as the housing 38 that have been presented hereinabove with reference to FIG. 6, the location of the drain conduit 76, i.e. from the tappet cavity portion 74, implies an appropriately low risk for having leaked fuel entering the housing and possibly mixing with the lube oil. This in turn implies an appropriately low risk of obtaining aeration and/or foaming of the lube oil in the housing 38.

Figure 7:
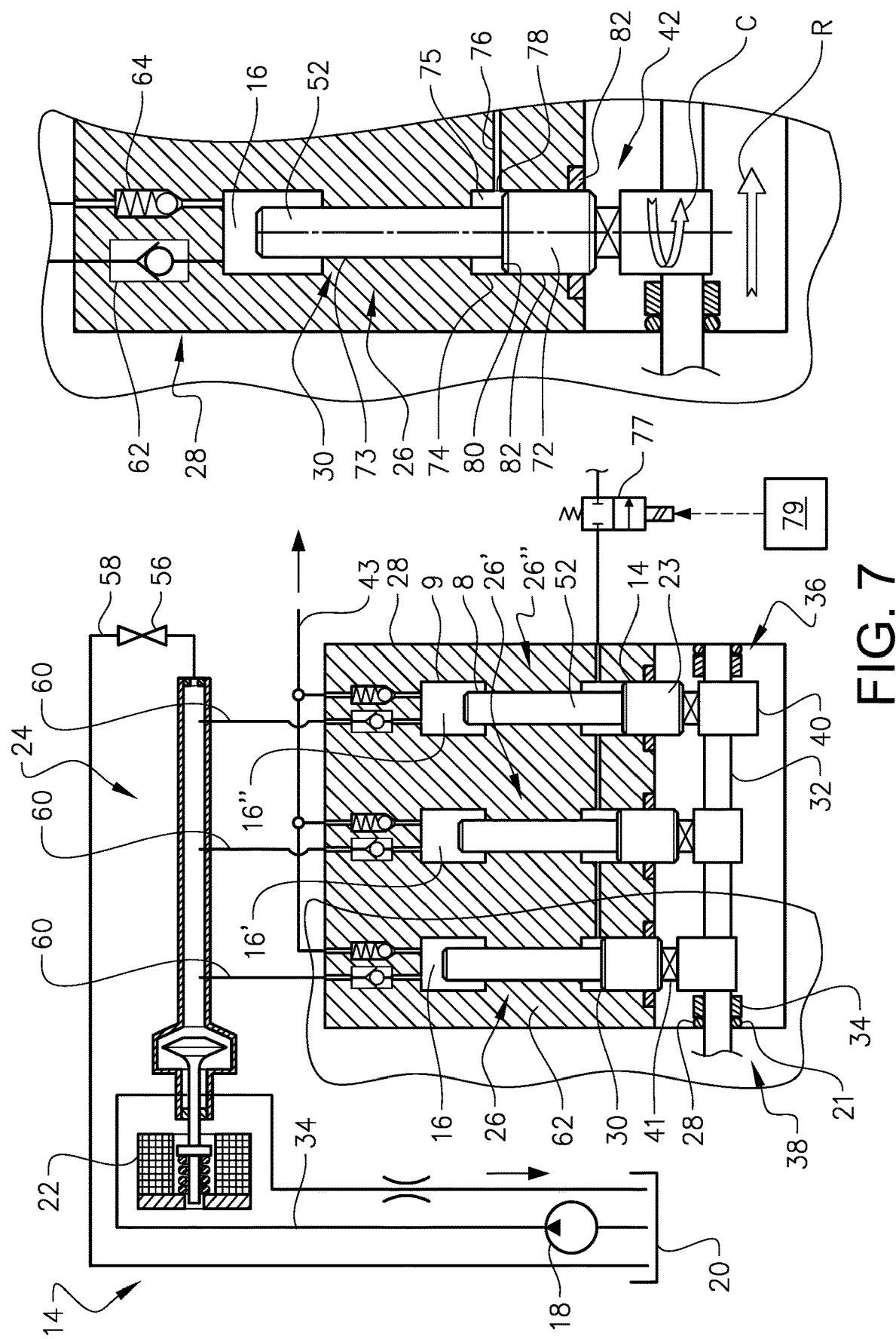
FIG. 7 illustrates a portion of an embodiment of a fuel pump assembly.

FIG. 7 illustrates another implementation the tappet seal 82. In the FIG. 7 implementation, the tappet seal 82 is a separate component that is attached to a portion of the fuel pump assembly 14 which does not move with the tappet 72. In FIG. 7, the tappet seal 82 is attached to a portion of the pump block 28. The FIG. 7 tappet seal 82 may comprise or even be constituted by a material that has appropriate sealing characteristics. Purely by way of example, the tappet seal 82, when being a separate component, may comprise an elastomer such as FFKM and/or a plastics material such as PTFE, with or without an energizer.

It should be noted that the features of the invention which have been discussed hereinabove with reference to any one of FIG. 2 to FIG. 4 may be combined with features of the invention that have been presented hereinabove with reference to any one of FIG. 5 and FIG. 7.

Figure 8:
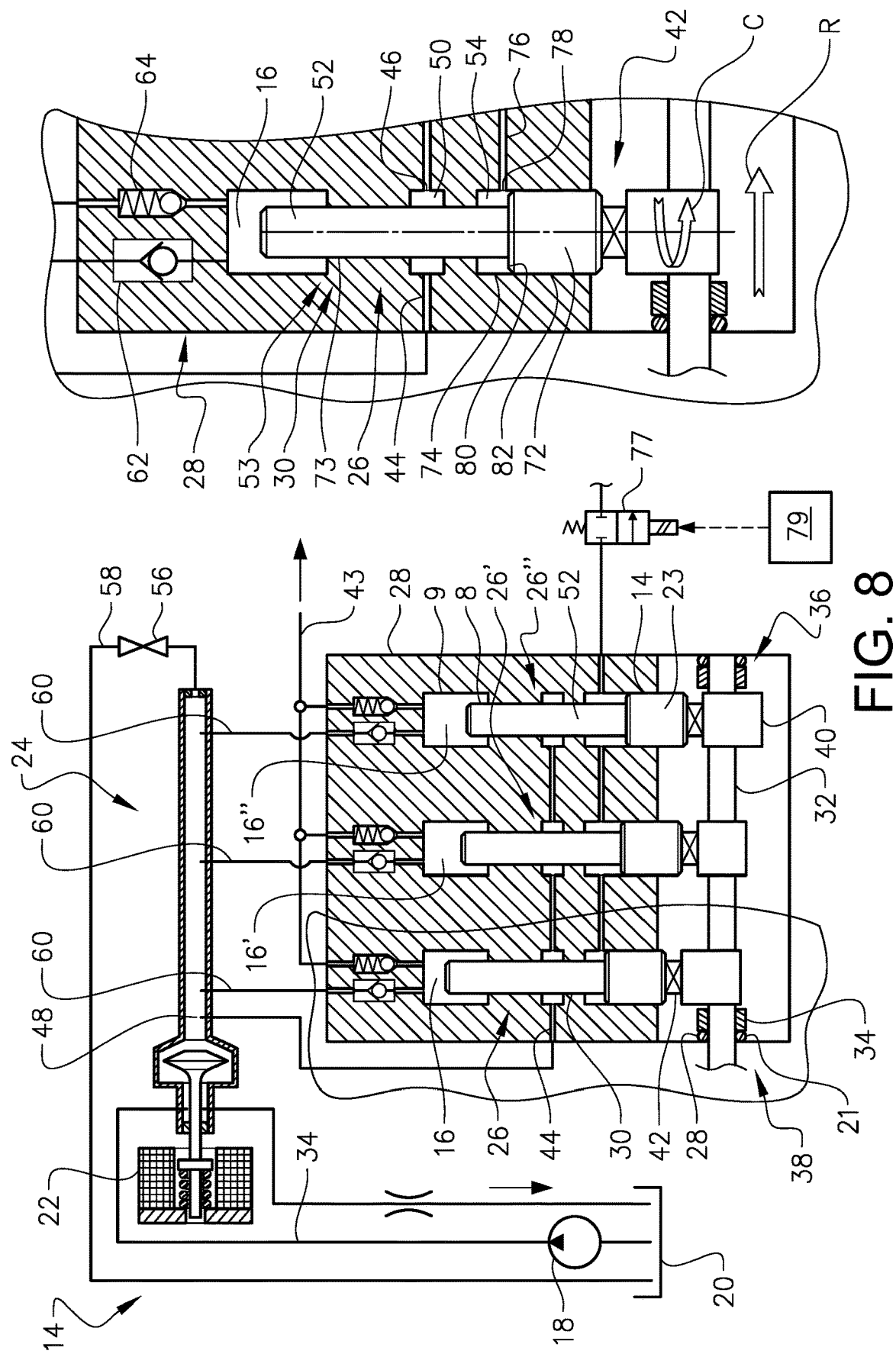
FIG. 8 schematically illustrates a fuel pump assembly for pressurizing fuel according to a further embodiment of the present invention.

To this end, reference is made to the embodiment illustrated in FIG. 8 which illustrates a fuel pump assembly 14 that comprises a combination of the features of the FIG. 2 and FIG. 5 embodiments of the present invention. Since the features of each one of the FIG. 2 and FIG. 5 embodiments have been thoroughly presented hereinabove, the features and their characteristics are not repeated in relation to the FIG. 8 embodiment.

It should be noted that the combination of features of the FIG. 2 and FIG. 5 embodiments may have a synergetic effect. Purely by way of example, in the FIG. 8 embodiment, the presence of any one of the sealing means 53, 54 and the fact that the tappet 72 has a larger cross-sectional area than the plunger 52 may imply an improved possibility to remove leaked fluid from the tappet cavity portion 74 via the low pressure leakage return conduit 76. This is since any one of the above-discussed sealing means 53, 54 implies a reduced risk of pumping the leaked fuel back to the pumping chamber 16.

It should be emphasized that embodiments alternative to the FIG. 8 embodiment may for instance comprise a leakage return cavity 68 in the pump block 28 such as the leakage return cavity 68 presented hereinabove in relation to FIG. 3.

Furthermore, it is envisaged that embodiments alternative to the FIG. 8 embodiment may for instance comprise a tappet seal 82 implementation such as one illustrated in FIG. 7.

FIG. 9 illustrates a flow chart of a method for pressurizing fuel using a fuel pump assembly 14, the fuel preferably comprising dimethyl ether (DME). The fuel pump assembly 14 comprises a plunger assembly 26 and a pump block 28 defining a pumping chamber 16 and a plunger assembly cavity 30. The fuel pump assembly comprises a metering valve 22 and a suction channel 24 located between the metering valve 22 and the pumping chamber 16 in an intended direction of flow of the fuel.

The method comprises a step S10 of pressurizing the fuel in the pumping chamber 16 by moving the plunger assembly 26 at least partially in the plunger assembly cavity 30 and a step S12 of guiding leaked fuel, having leaked from the pumping chamber 16 to the plunger assembly cavity 30, directly back to the suction channel 24. As an example, leaked fuel may be guided directly back to the suction channel 24 due to the fact that the leaked fuel is guided in a conduit, in fluid communication with each of the plunger assembly cavity and the suction channel 24, which conduit does not have any valves or other flow preventing means.

The method may for instance be performed by any one of the embodiments of the fuel pump assembly 14 that have been discussed hereinabove with reference to any one of FIG. 2 to FIG. 4 or FIG. 8.

It is to be understood that the present invention is not limited to the embodiments described above and illustrated in the drawings; rather, the skilled person will recognize that many changes and modifications may be made.

The invention claimed is:

1. A fuel pump assembly for pressurizing fuel, the fuel comprising a high-volatility fuel, the fuel pump assembly comprising a plunger assembly and a pump block defining a pumping chamber and a plunger assembly cavity in communication with the pumping chamber, the plunger assembly being movable at least partially in the plunger assembly cavity towards and away from the pumping chamber, wherein the fuel pump assembly comprises a metering valve and a suction channel located between the metering valve and the pumping chamber in an intended direction of flow of the fuel, wherein the fuel pump assembly comprises a leakage return conduit, with a first leakage return conduit opening in fluid communication with the plunger assembly cavity, adapted to return fuel that has leaked from the pumping chamber, wherein the leakage return conduit comprises a second leakage return conduit opening located in the suction channel, wherein the pumping chamber assumes a minimum volume when the plunger assembly is at a top position and wherein the pumping chamber assumes a maximum volume when the plunger assembly is at a bottom position, the maximum volume being within the range of 10 to 30 times the minimum volume.

2. The fuel pump assembly according to claim 1, wherein the first leakage return conduit opening is located in the plunger assembly cavity.

3. The fuel pump assembly according to claim 1, wherein the plunger assembly cavity comprises a leakage chamber at least partially surrounding the plunger assembly, the first leakage return conduit opening being located in the leakage chamber.

4. The fuel pump assembly according to claim 1, wherein the fuel pump assembly comprises a first sealing means for preventing fuel from escaping from the pumping chamber along the plunger assembly.

5. The fuel pump assembly according to claim 4, wherein the first sealing means is obtained by means of a clearance between the plunger assembly and a portion of the pump block the clearance being within the range of 0.1 to 10 micrometres measured in diameter differences.

6. The fuel pump assembly according to claim 5, wherein the first leakage return conduit opening is located downstream of the first sealing means.

7. The fuel pump assembly according to claim 4, wherein the fuel pump assembly comprises a second sealing means for preventing fuel that has passed the first sealing means from passing further along the plunger assembly, the leakage return conduit opening being located between the pumping chamber and the second sealing means.

8. The fuel pump assembly according to claim 7, wherein the second sealing means is obtained by means of a clearance between the plunger assembly and a portion of the pump block, the clearance being within the range of 0.1 to 10 micrometres measured in diameter differences.

9. The fuel pump assembly according to claim 8, wherein the second sealing means comprises an elastomer and/or a plastics material.

10. The fuel pump assembly according to claim 1, further comprising a bleed valve adapted to selectively provide a fluid communication between the suction channel and a source of fuel.

11. The fuel pump assembly according to claim 1, wherein the suction channel comprises a discharge port adapted to discharge fuel to the pumping chamber, the bleed valve and the metering valve being located on opposite sides of the discharge port.

12. The fuel pump assembly according to claim 1, wherein the suction channel comprises a discharge port adapted to discharge fuel to the pumping chamber, the metering valve and the discharge port being located on opposite sides of the bleed valve.

13. The fuel pump assembly according to claim 1, wherein, when measured along an intended direction of flow in the suction channel, the bleed valve is located a first distance from the metering valve and the discharge port is located a second distance from the bleed valve, the second distance being smaller than the first distance.

14. The fuel pump assembly according to claim 1, wherein the fuel pump assembly comprises an inlet valve positioned between the suction channel and the pumping chamber, adapted to control the flow of fuel into the pumping chamber.

15. The fuel pump assembly according to claim 1, wherein the leakage return conduit comprises a leakage return cavity in the pump block, wherein the leakage return cavity having a circumferential extension in a circumferential direction and the leakage return cavity at least partially circumscribes the plunger assembly cavity and/or the pumping chamber in the circumferential direction.

16. The fuel pump assembly according to claim 1, wherein the plunger assembly comprises a plunger and a tappet, the plunger assembly cavity comprising a plunger cavity portion, adapted to accommodate at least a portion of the plunger, and a tappet cavity portion, adapted to accommodate at least a portion of the tappet, wherein the fuel pump assembly comprises a drain conduit with a drain conduit opening located in the tappet cavity portion.

17. The fuel pump assembly according to claim 1, wherein the plunger assembly comprises a force-transferring bearing for transferring forces from a camshaft to the plunger assembly.

18. The fuel pump assembly according to claim 1, wherein the fuel pump assembly comprises a feeding fuel pump assembly adapted to feed fuel to the pumping chamber.

19. The fuel pump assembly according to claim 18, wherein the feeding fuel pump assembly is located upstream of the metering valve in an intended direction of flow of the fuel.

20. An internal combustion engine comprising a fuel pump assembly according to claim 1.

21. A vehicle comprising a fuel pump assembly in accordance with claim 1.

22. A method for pressurizing fuel using a fuel pump assembly, the fuel comprising a high-volatility fuel, the fuel pump assembly comprising a plunger assembly and a pump block defining a pumping chamber and a plunger assembly cavity, wherein the fuel pump assembly comprises a metering valve and a suction channel located between the metering valve and the pumping chamber in an intended direction of flow of the fuel, wherein the fuel pump assembly comprises a leakage return conduit, with a first leakage return conduit opening in fluid communication with the plunger assembly cavity, adapted to return fuel that has leaked from the pumping chamber, wherein the leakage return conduit comprises a second leakage return conduit opening located in the suction channel, wherein the pumping chamber assumes a minimum volume when the plunger assembly is at a top position and wherein the pumping chamber assumes a maximum volume when the plunger assembly is at a bottom position, the maximum volume being within the range of 10 to 30 times the minimum volume, the method comprising: pressurizing the fuel in the pumping chamber by moving the plunger assembly at least partially in the plunger assembly cavity and guiding leaked fuel, having leaked from the pumping chamber to the plunger assembly cavity, directly back to the suction channel.

23. A fuel pump assembly for pressurizing fuel, the fuel comprising a high-volatility fuel, the fuel pump assembly comprising a plunger assembly and a pump block, the pump block defining a pumping chamber and a plunger assembly cavity in fluid communication with the pumping chamber, the plunger assembly being movable at least partially in the plunger assembly cavity towards and from the pumping chamber, the plunger assembly comprising a plunger and a tappet wherein the cross-sectional area of the tappet is larger than the cross-sectional area of the plunger, the plunger assembly cavity comprising a tappet cavity portion, adapted to accommodate at least a portion of the tappet, wherein the fuel pump assembly comprises a drain conduit for draining fluid that has leaked past a portion of the plunger assembly, the drain conduit comprising a drain conduit opening located in the tappet cavity portion, wherein the plunger assembly is adapted to be driven by a driving member which is rotatably mounted in a housing which is connected to the pump block, wherein the fuel pump assembly further comprising a lube oil supply line provided in the housing, and in that the lube oil supply line comprises a lube oil supply valve.

24. The fuel pump assembly according to claim 23, wherein the fuel pump assembly comprises a plunger cavity portion, adapted to accommodate at least a portion of the plunger, and a leakage return conduit with a first leakage return conduit opening located in the plunger cavity portion.

25. The fuel pump assembly according to claim 24, wherein the fuel pump assembly comprises a metering valve and a suction channel located between the metering valve and the pumping chamber in an intended direction of flow of the fuel, the leakage return conduit comprising a second leakage return conduit opening located in the suction channel.

26. The fuel pump assembly according to claim 24, wherein the leakage return conduit comprises a leakage return cavity in the pump block, wherein the leakage return cavity has a circumferential extension in a circumferential direction and the leakage return cavity at least partially circumscribes a portion of the plunger assembly cavity and/or a portion of the pumping chamber in the circumferential direction.

27. The fuel pump assembly according to claim 23, wherein the plunger cavity portion comprises a leakage chamber at least partially surrounding the plunger, the leakage return conduit opening being located in the leakage chamber.

28. The fuel pump assembly according to claim 23, wherein the fuel pump assembly comprises a first sealing means for preventing fuel from escaping from the pumping chamber along the plunger assembly, the first sealing means being located between the pumping chamber and the leakage return conduit opening.

29. The fuel pump assembly according to claim 28, wherein the first sealing means is obtained by means of a clearance between the plunger and a portion of the pump block, the clearance being within the range of 0.1 to 10 micrometers, measured in diameter differences.

30. The fuel pump assembly according to claim 28, wherein the fuel pump assembly comprises a second sealing means for preventing fuel that has passed the first sealing means from passing further along the plunger assembly, the leakage return conduit opening being located between the pumping chamber and the second sealing means.

31. The fuel pump assembly according to claim 30, wherein the second sealing means is obtained by means of a clearance between the plunger and a portion of the pump block, the clearance being within the range of 0.1 to 10 micrometers measured in diameter differences.

32. The fuel pump assembly according to claim 30, wherein the second sealing means comprises an elastomer and/or a plastics material.

33. The fuel pump assembly according to claim 23, wherein the plunger assembly and the pump block are arranged such that a tappet seal is obtained for preventing fuel from passing between a portion of the tappet and the pump block.

34. The fuel pump assembly according to claim 33, wherein the tappet seal is obtained by means of a clearance between the tappet and a portion of the pump block, the clearance being within the range of 5 to 100 micrometers measured in diameter differences.

35. The fuel pump assembly according to claim 23, wherein the fuel pump assembly comprises an inlet valve, the inlet valve being a spring-less inlet valve, positioned between the suction channel and the pumping chamber, adapted to control the flow of fuel into the pumping chamber.

36. The fuel pump assembly according to claim 23, wherein the pumping chamber assumes a minimum volume when the plunger assembly is at a top position and wherein the pumping chamber assumes a maximum volume when the plunger assembly is at a bottom position, the maximum volume being within the range of 10 to 30 times the minimum volume.

37. The fuel pump assembly according to claim 23, wherein the plunger assembly comprises a force-transferring bearing for transferring forces from a camshaft to the tappet.

38. The fuel pump assembly according to claim 23, wherein fuel pump assembly comprises a feeding fuel pump assembly adapted to feed fuel to the pumping chamber.

39. The fuel pump assembly according to claim 38, wherein the fuel pump assembly comprises a plunger cavity portion, adapted to accommodate at least a portion of the plunger, and a leakage return conduit with a first leakage return conduit opening located in the plunger cavity portion, wherein the fuel pump assembly comprises a metering valve and a suction channel located between the metering valve and the pumping chamber in an intended direction of flow of the fuel, the leakage return conduit comprising a second leakage return conduit opening located in the suction channel, and wherein the feeding fuel pump assembly is located upstream of the metering valve in an intended direction of flow of the fuel.

40. The fuel pump assembly according to claim 23, further comprising a bleed valve adapted to selectively provide a fluid communication between the suction channel and a source of fuel.

41. The fuel pump assembly according to claim 40, wherein the suction channel comprises a discharge port adapted to discharge fuel to the pumping chamber, the bleed valve and the metering valve being located on opposite sides of the discharge port.

42. The fuel pump assembly according to claim 40, wherein the suction channel comprises a discharge port adapted to discharge fuel to the pumping chamber, the metering valve and the discharge port being located on opposite sides of the bleed valve.

43. The fuel pump assembly according to claim 42, wherein, when measured along an intended direction of flow in the suction channel, the bleed valve is located a first distance from the metering valve and the discharge port is located a second distance from the bleed valve, the second distance being smaller than the first distance.

44. The fuel pump assembly according to claim 23, further comprising a lube oil reservoir outside the housing, the lube oil supply line providing a fluid communication between the lube oil reservoir and the housing, the fuel pump assembly further comprising a lube oil separator in fluid communication with the lube oil reservoir, the drain conduit being adapted to be in fluid communication with the lube oil separator.

45. The fuel pump assembly according to claim 44, wherein the drain conduit is connected to a valve, which in turn is connected to the lube oil separator, the valve being adapted to control the fluid communication between the drain conduit and the lube oil separator.

46. The fuel pump assembly according to claim 43, further comprising a second drain conduit, the second drain conduit being in fluid communication with the housing.

47. The fuel pump assembly according to claim 46, further comprising a lube oil reservoir outside the housing, the lube oil supply line providing a fluid communication between the lube oil reservoir and the housing, the fuel pump assembly further comprising a lube oil separator in fluid communication with the lube oil reservoir, the drain conduit being adapted to be in fluid communication with the lube oil separator, wherein the drain conduit is connected to a valve which in turn is connected to the lube oil separator, the valve being adapted to control the fluid communication between the drain conduit and the lube oil separator, wherein the second drain conduit is in fluid communication with the valve.

48. An internal combustion engine comprising a fuel pump assembly according to claim 23.

49. A vehicle comprising a fuel pump assembly in accordance with claim 23.

* * * * *